United States Patent [19]

Fedter et al.

[11] Patent Number: 5,010,315
[45] Date of Patent: Apr. 23, 1991

[54] THERMAL RADIATION SENSOR

[75] Inventors: Horst Fedter, Bühlertal; Werner Grünwald, Gerlingen; Peter Nolting, Bühlertal; Claudio de la Prieta, Stuttgart; Kurt Schmid, Ditzingen-Schöckingen, all of Fed. Rep. of Germany

[73] Assignee: Robert Bosch GmbH, Stuttgart, Fed. Rep. of Germany

[21] Appl. No.: 425,166

[22] PCT Filed: Mar. 10, 1988

[86] PCT No.: PCT/DE88/00134
§ 371 Date: Aug. 18, 1989
§ 102(e) Date: Aug. 18, 1989

[87] PCT Pub. No.: WO88/07180
PCT Pub. Date: Sep. 22, 1988

[30] Foreign Application Priority Data

Mar. 20, 1987 [DE] Fed. Rep. of Germany ....... 3709201

[51] Int. Cl.$^5$ .............................................. H01C 7/06
[52] U.S. Cl. ..................... 338/7; 338/22 R; 338/25; 338/18; 250/352
[58] Field of Search ............... 374/127, 128, 132, 178, 374/32; 219/504, 505; 250/352, 346, 338.1, 349; 338/7, 8, 9, 22 R, 22 SD, 25, 15, 18

[56] References Cited

U.S. PATENT DOCUMENTS

| 3,287,976 | 11/1966 | Euser et al. | 338/25 X |
| 3,622,901 | 11/1971 | Ledran et al. | 338/25 |
| 4,531,110 | 7/1985 | Johnson, Jr. et al. | 338/22 R |
| 4,770,541 | 9/1988 | Fedter et al. | 374/32 |

FOREIGN PATENT DOCUMENTS

3536133A1 4/1987 Fed. Rep. of Germany .
553974 9/1974 Switzerland .

Primary Examiner—Marvin M. Lateef
Attorney, Agent, or Firm—Michael J. Striker

[57] ABSTRACT

A thermal radiation sensor is suggested which comprises two receiver surfaces exposed to the radiation, one receiver surface (1) having a high absorption capacity with respect to the thermal radiation, the other (2) having a low absorption capacity, the two receiver surfaces (1) and (2) consist of a NTC resistance material and are combined in a bridge circuit together with two temperature-independent cermet resistors (3) and (4). In order to prevent a dependency of the measurements of such a sensor on the ambient temperature, the NTC resistors (1) and (2) comprise underlying heating layers (6) and (7) which keep the two NTC resistors at a constant temperature. Insulating layers (8) and (9) are provided between the NTC resistors (1) and (2) and the heating layers (6) and (7). The heating layers (6) and (7) consist of a cermet thick film with platinum or of a platinum thick film and have the shape of a meander. The insulating layers (8) and (9) preferably consist of a crystallizing glass.

4 Claims, 1 Drawing Sheet

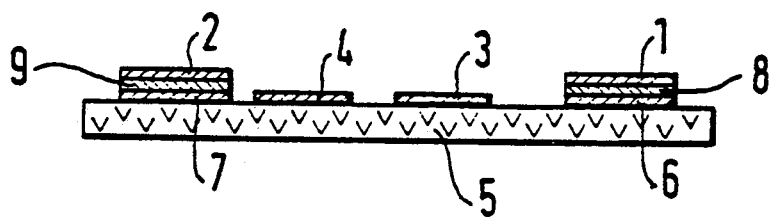
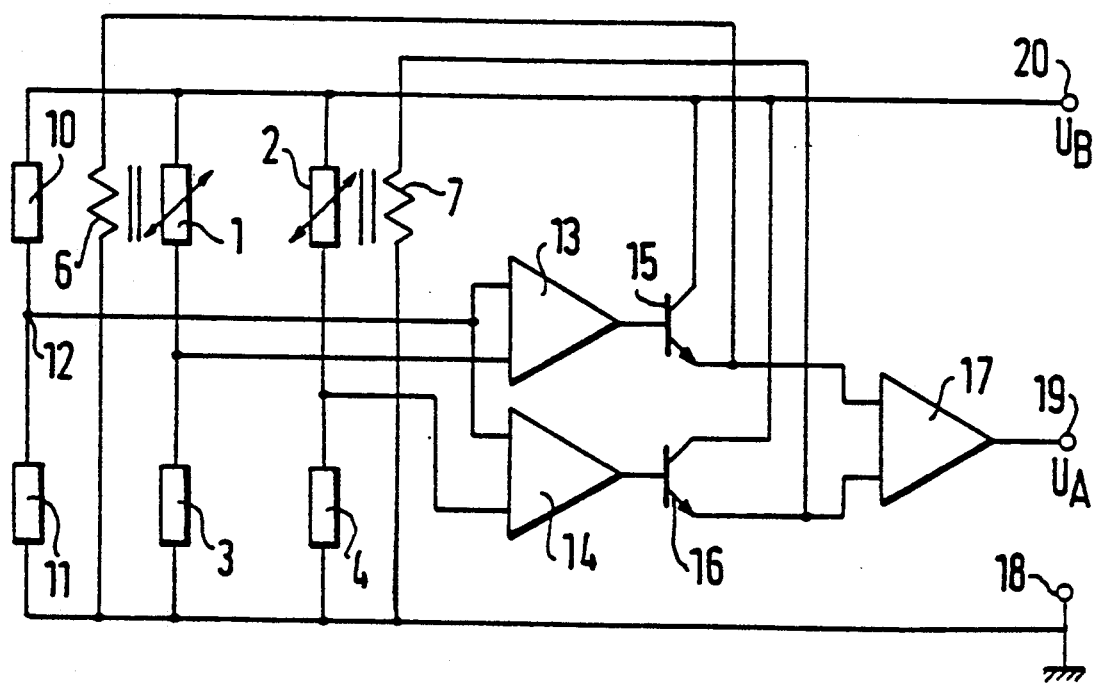

THERMAL RADIATION SENSOR

PRIOR ART

The invention is based on a thermal radiation sensor according to the generic part of the main claim. A thermal radiation sensor is known from the DE-OS 35 36 133 and comprises two receiver surfaces which are exposed to the radiation, one of which receiver surfaces has a high absorption capacity with respect to the thermal radiation, e.g. by means of blackening, the other receiver surface having a low absorption capacity, e.g. by means of a covering reflecting the thermal radiation. These two receiver surfaces consist of a NTC resistive material and are combined in a bridge circuit together with two temperature-independent cermet resistors. The four resistors are applied to a ceramic substrate and connected with conductor paths which, in turn, end in the necessary connections. However, because of the convective heat transfer at the sensor surfaces, this arrangement has the disadvantage that the output signal depends heavily on the ambient temperature. Thus, in one and the same thermal radiation sensor, as indicated above, at a radiation intensity of 1000 W/m² an output voltage of 900 mV is obtained at $-30°$ C. and an output voltage of 550 mV is obtained at $0°$ C. and at $30°$ C. In many cases such a dependency of the measurements on the ambient temperature is disadvantageous.

ADVANTAGES OF THE INVENTION

The thermal radiation sensor, according to the invention, with the characterizing features of the main claim has the advantage that the measurement signals no longer show any dependency on the ambient temperature, so that the same measured value can always be obtained at the same radiation intensity regardless of the temperature.

Advantageous developments and improvements of the radiation sensor indicated in the main claim are made possible by means of the steps indicated in the subclaims. It is particularly advantageous if the heating layers consist of a cermet thick film with platinum and have the shape of a meander, so that they can easily be balanced.

In can be shown in physico-mathematical terms that the measurement for the occurring radiation output is in fact independent from the ambient temperature in a substraction between the two sensors, one sensor having a high absorption capacity and the other having a low absorption capacity with respect to the thermal radiation.

The following applies to the first sensor (per surface unit):

$$Q_1 el + M = \epsilon_1 \cdot \delta \cdot T_1 + r_1 \cdot M + A(T_1 - T_u) \quad (1)$$

Qel = electrically supplied power
M = occurring radiation output
$\epsilon$ = emissivity of the sensor surface
$\delta$ = Boltzmann's constant
T = Sensor temperature
A = Constant of the heat transfer to the surrounding air
$T_u$ = Air temperature
r = Reflection coefficient
Values with index number 1 refer to the first sensor.

In the same way, the following applies to the second sensor:

$$Q_2 el + M = \epsilon_2 \cdot \delta \cdot T_2 + r_2 M + A(T_2 - T_u) \quad (2)$$

Values with index number 2 refer to the second sensor.

The following results from the subtraction of (1) and (2):

$$Q_1 el - Q_2 el = \delta(\epsilon_1 T_1 - \epsilon_2 T_2) + (r_1 - r_2) M + A(T_1 - T_2), \quad (3)$$

i.e., $M = \dfrac{Q_1 el - Q_2 el - \delta(\epsilon_1 \cdot T_1 - \epsilon_2 \cdot T_2) - A(T_1 - T_2)}{(r_1 - r_2)}$ For $T_1 = T_2 = T$, the equation simplifies to $$M = \frac{Q_1 el - Q_2 el - \delta(\epsilon_1 - \epsilon_2) \cdot T}{r_1 - r_2}$$

i.e. the measured quantity M is independent of the ambient temperature.

BRIEF DESCRIPTION OF THE DRAWINGS

An embodiment example of the invention is shown in the drawing and explained in more detail in the following description.

FIG. 1 shows a section through the layer construction of a sensor, according to the invention, FIG. 2 shows an electric circuit which indicates how the individual layers of the sensor are electrically connected with one another and FIG. 3 shows a plan view of the sensor in accordance with the present invention.

DESCRIPTION OF THE EMBODIMENT EXAMPLE

According to FIG. 1, the sensor comprises a ceramic substrate in the form of a thin plate 5 which preferably consists of aluminum oxide. The heating conductor layers 6 and 7 are first printed on this substrate in the shape of a meander as shown in FIG. 3 and fired at approximately 1530° C., the heating conductor layers 6 and 7 consisting of a platinum thick film, possibly with a proportion of 20% by volume of a ceramic supporting framework material such as aluminum oxide. These heating resistors have a resistance of approximately 30Ω in the finished state. The insulating layers 8 and 9, which consist of a crystallizing glass, e.g. of type 9105HT from the Heraeus company, are then printed on the heating layers 6 and 7 and fired at 950° C. This is followed by the printing on of the conductor path pattern, not shown, which is necessary for the connection of the individual layers, with subsequent firing at 850° C. The NTC resistors 1 and 2 are then printed on, wherein a material in the form of a paste is used which results in resistors resulting in a square resistance of 5 kΩ and a control constant B of 2200 Kelvin. The resistor paste NTC 135 from the Heraeus company, for example, is suitable for this purpose. The temperature-independent resistors 3 and 4 are then applied by means of printing on a cermet material, which results in a square resistance of 10 kΩ, e.g. the material with number 1441 from the Dupont company, specifically with a thickness such that a film thickness of 8 μm remains after firing. The four resistors 1, 2, 3 and 4 are fired jointly at 850° C. in air. Finally, the conductor path connections to the two NTC resistors are applied, wherein, of course, care must be taken in the layout that the conductor paths only intersect at those points at which this is intended out of electrical considerations. Finally, the entirety is fired again at approximately 850° C.

The further installation in a frame, not shown, and the covering of the two NTC resistors is effected in the same manner as described in DE-OS 35 36 133.

The electrical circuit for operating the sensor, according to the invention, is shown in FIG. 2. A voltage of e.g. 12V is applied between the points 18 and 20, the voltage being divided by means of the resistors 10 and 11 in such a way that a reference potential of e.g. 6V occurs at the intersection 12. The corresponding tap between the NTC resistor 1 and the resistor 3 is transmitted to a differential amplifier 13, while the tap between the NTC resistor 2 and the resistor 4 is transmitted to another differential amplifier 14. The outputs of the differential amplifiers 13 and 14 lead to current amplifiers 15 and 16, proceeding from which the heating layers 6 and 7 are controlled in such a way that they have identical constant temperature. The outputs of the current amplifiers 15 and 16 lead to another differential amplifier 17 which processes the arriving signals in analog in such a way that an output voltage proportional to the radiation intensity can be tapped between points 18 and 19, which output voltage is independent of the ambient temperature and lies in the range from 0 to approximately 600 mV when the radiation intensity rises from 0 to approximately 1000 W/m$^2$ and the resistors 1, 2, 3 and 4 at room temperature have approximately 10 kΩ and the control constant B lies at 2200 Kelvin.

We claim:

1. Thermal radiation sensor comprising two receiver surfaces which are exposed to the radiation, one receiver surface (1) having a high absorption capacity with reference to the thermal radiation, the other (2) having a low absorption capacity, both receiver surfaces comprise a NTC resistance material and are combined in a bridge circuit together with two temperature-independent resistors (3 and 4), characterized in that the NTC resistors (1) and (2) comprise underlying heating layers (6) and (7) which keep the two NTC resistors at a constant temperature.

2. Thermal radiation sensor according to claim 1, characterized in that insulating layers (8) and (9) are provided between the NTC resistors (1) and (2) and the heating layers (6) and (7).

3. Thermal radiation sensor according to claim 2, characterized in that the heating layers (6) and (7) consist of a cermet thick film with platinum or of a platinum thick film and have the shape of a meander.

4. Thermal radiation sensor according to claim 2 characterized in that the insulating layers (8) and (9) consist of a crystallizing glass.

* * * * *